UNITED STATES PATENT OFFICE.

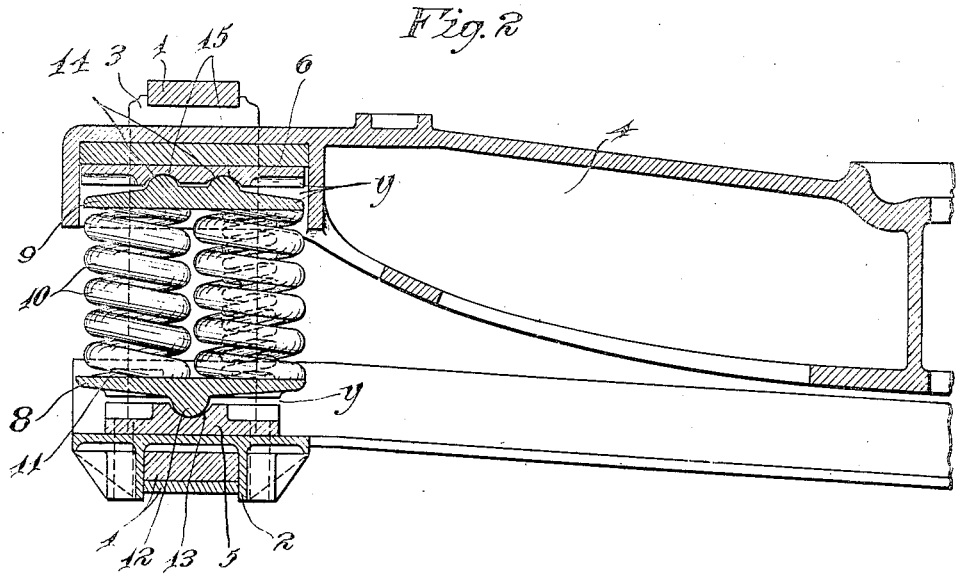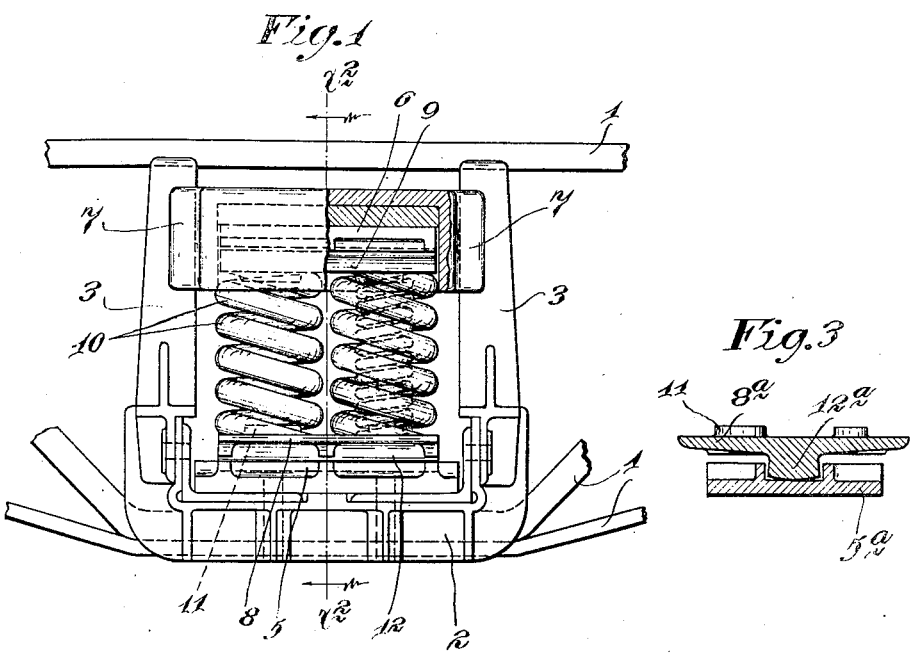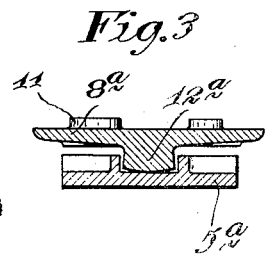

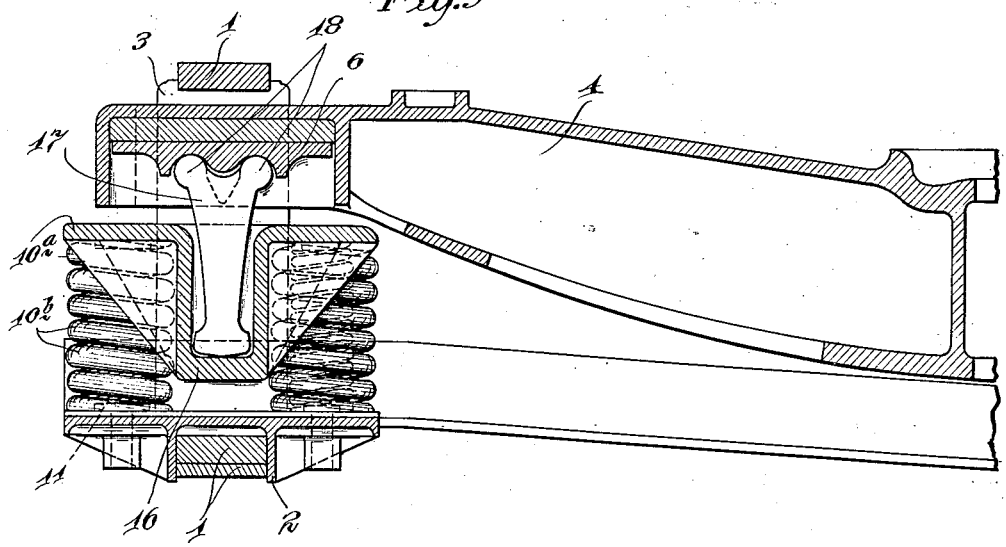
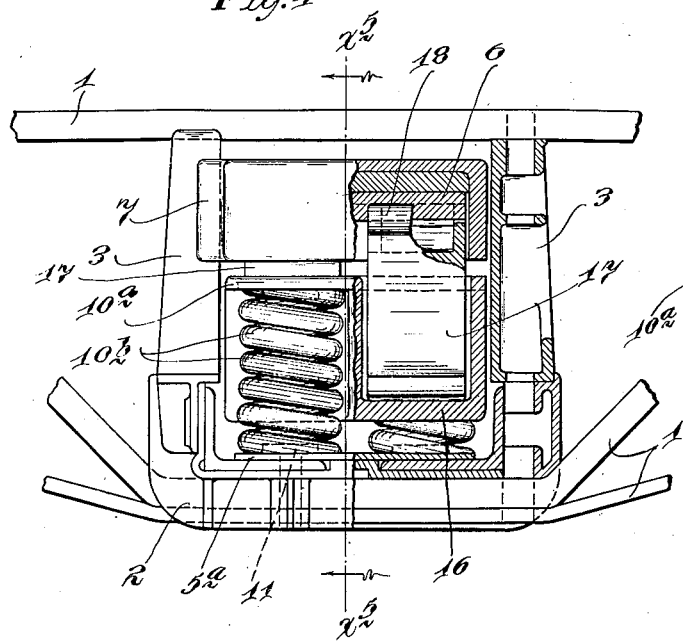
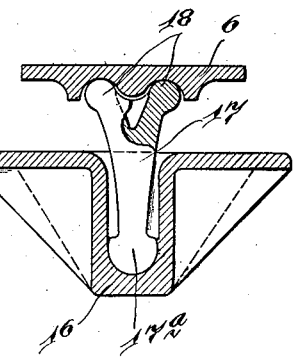

WILLIAM H. WILSON, OF ST. PAUL, MINNESOTA.

LATERAL-MOTION CAR-TRUCK.

1,057,990. Specification of Letters Patent. Patented Apr. 1, 1913.

Application filed November 4, 1911. Serial No. 658,499.

*To all whom it may concern:*

Be it known that I, WILLIAM H. WILSON, a citizen of the United States, residing at St. Paul, in the county of Ramsey and State of Minnesota, have invented certain new and useful Improvements in Lateral-Motion Car-Trucks; and I do hereby declare the following to be a full, clear, and exact description of the invention, such as will enable others skilled in the art to which it appertains to make and use the same.

My invention relates generally to car trucks having lateral motion devices whereby the car wheels and trucks may move laterally in respect to the car body, or otherwise stated, in which the car body may move laterally in respect to the said wheels and trucks.

As is well known, the greatest cause of excessive wear of the wheel flanges of car trucks is due to the bolster being out of center and of the wheel flanges being thrust against the rails excessively in rounding curves. Numerous lateral motion devices have been disclosed in patents, and some put into actual use, for preventing such excessive wear of the wheel flanges. The chief defect in prior lateral motion devices is that normally, they offer very slight resistance to movements of the truck bolster out of center, so that a constant swaying or slight lateral vibratory movement of the truck wheels is permitted, even when running on straight or nearly straight tracks, and when there is no occasion for such lateral movements, but when, on the contrary, better running action would be produced by holding the truck bolster centered.

I correct the above noted defects in the lateral motion devices of car trucks by the use of so-called three-point rockers which are interposed between suitable lower and upper bearings applied, respectively, to the trucks and to the truck bolsters or other parts which move with the car body transversely of the truck. These three-point-contact rockers are gravity-held with all three contact points sustaining the load weight under all normal conditions. In rounding a curve, the wheel flanges first feel the force of the change in direction, and unless this force be properly absorbed through the truck, the wear on the wheel flanges, rail and couplers, will be excessive and the life of the said parts will be shortened. The three-point bearings or rockers, as indicated, maintain their normal positions, and permit the truck springs first to absorb the lateral force under average conditions, such as are met with in rounding moderate curves at ordinary freight speed. If, however, the lateral force is greater than that ordinarily met with, the three-point rockers will oscillate from normal intermediate positions and permit as much more lateral play of the truck bolster, as may be required to absorb the shock or lateral strain, and prevent the wheel flanges from being forced excessively against the rails.

Generally stated, the invention consists of the novel devices and combinations of devices illustrated, described and defined in the claims.

In the accompanying drawings wherein several forms of the present invention are illustrated, like characters indicate like parts throughout the several views.

Referring to the drawings, Figure 1 is a fragmentary view in side elevation showing portions of a car truck having my invention incorporated therein, some parts being broken away; Fig. 2 is a transverse vertical section taken on the line $x^2$ $x^2$ on Fig. 1, some parts being broken away; Fig. 3 is a detail view in transverse vertical section illustrating a side modification in the form of the lower contact of the three-point rocker; Fig. 4 is a view corresponding to Fig. 1, but illustrating a modified form of the rocker; Fig. 5 is a vertical section taken approximately on the line $x^5$ $x^5$ of Fig. 4, some parts being broken away; and Fig. 6 is a sectional view illustrating a slightly modified form of the rocker illustrated in Figs. 4 and 5.

So far as my present invention is concerned, the truck frame may be of any approved or suitable construction or type, and the same statement is true in respect to the truck bolster. In the particular form of the truck illustrated, however, the numeral 1 indicates the truck side frames which include saddle plates 2 and columns 3.

The truck bolster is indicated as an entirety by the numeral 4. In the construction illustrated in Figs. 1 and 2, the lower rocker bearings 5 partake of the lateral movements of the truck side frames, and, as shown, are rigidly secured on the saddle plates 2 between the columns 3. The upper rocker bearing 6 is, as shown, set in the ends of the bolster 4, and partakes of endwise movements of the bolster transversely of the truck. The bolster, as is usual in this type of truck, works between the columns 3 and is provided with suitable stop lugs 7 that engage said columns and limit the endwise movements of said bolster transversely of the truck.

The rockers illustrated in Figs. 1 and 2 are each made up of a spring base 8, a spring cap 9, and a group of coiled springs 10 interposed between the said parts 8 and 9, to hold the said springs against displacement with respect to the members 8 and 9. Said parts are preferably formed with centering lugs 11 that telescope into the ends of the said springs. The spring bases 8 are formed with fulcrumed ribs or lugs 12 that extend longitudinally of the truck side frames and are seated in grooves 13 formed in the lower rocker bearing 5. The spring cap 9 is provided on top with two laterally spaced fulcrumed ribs or lugs 14 that normally engage grooves or seats 15 formed on the underside of the overlying upper rocker bearing 6. The said fulcrumed lugs or ribs 12 and 14 constitute the so-called three bearing points of the rocker, and it will be noted that the bearing point 12 is located in a vertical plane that extends midway between the bearing points 14. With this arrangement, it is obvious that gravity will exert a very considerable force tending to maintain the rockers in their intermediate positions to the truck bolster centered. Excessive force will, however, oscillate the rockers and permit such endwise movements of the truck bolster as are permitted by the stop lugs 7. The said stop lugs 7, of course, limit the extreme endwise movements of the truck bolster. By incorporating the bolster supporting springs in the lateral motion rockers, a very simple and compact construction is provided.

With the construction just described, excessive endwise movements of the truck bolster will bring the spring base 8 and spring cap 9, respectively, into contact with the coöperating bearings 5 and 6, at points marked y on Fig. 2, and the springs 8 are thus further utilized to cushion extreme movements of the said bolster.

In the modified construction illustrated in Fig. 3, the lower rocker bearing 5$^a$ is provided with a flat seat that is engaged by a bearing point or lug 12$^a$ of the spring base 8$^a$; and in this construction, the bottom of the lug 12$^a$ is given a long curve and is made in the form of a rocker so that when the spring base 8$^a$ is oscillated, there will be a rocking action in which the point of contact between the said members 12$^a$ and 5$^a$ shifts. This flattened fulcrumed lug and the rolling action thereby produced increase the tendency of the rocker to remain in normal position and to return to normal position after having been moved out of center.

In the construction illustrated in Figs. 4 and 5, the above noted parts 1, 2, 3, 4, and 6 are employed, but the spring base 5$^a$ is rested directly on the saddle plate 2, and the spring cap, between which and the said base the springs 10 are interposed, is guided for vertical movements by the columns 3. The three-point rockers 16 in this construction are integral or solid metal structures, which are preferably arranged in pairs and the lower ends of which are engaged with the bottoms of the pockets 17 formed in the said spring caps 10$^a$. At their upper ends, these rockers 16 are provided with two-point contacts or bearings 18 that normally engage seats in the underside of the upper rocker bearing 6. In this construction, as is evident, the so-called spring cap 10$^a$ also serves as a lower rocker bearing. Preferably, the lower ends of the rocker 16 are somewhat flattened so as to increase the tendency of the said rockers to maintain centered or intermediate normal positions. However, the said rockers, at their lower ends, may be provided with rounded bearing heads 17$^a$, as shown in Fig. 6, and which are simply made to oscillate in the coöperating bearing pockets 17.

Preferably, the two-point bearings are located at the upper extremities of the rockers and the third-point bearing at the lower extremities of said rockers, but it is obvious that it would be within the scope of this invention, as herein disclosed and defined in the claims, to invert said parts or reverse the said relation thereof. If a fourth bearing point were to be added to that end of the rocker which is designated as having a single-point-contact, one or the other thereof would be an unnecessary and undesirable element; but even if this unnecessary addition were made, the device would still involve the three-point rocker. Furthermore, the best operative arrangement is provided by the use of only three bearing points or contacts on the rocker.

What I claim is:

1. In a truck, the combination with side frames and a truck bolster, of a lower bearing partaking of the lateral movements of said side frames, upper bearings partaking of the endwise movements of the truck bolster transversely of the truck, and three-point lateral motion rockers interposed between said bearings.

2. In a truck, the combination with side frames and a truck bolster, of lower bearings partaking of the lateral movements of said side frames, upper bearings partaking of the endwise movements of said bolster transversely of the truck, and lateral motion rockers interposed between said upper and lower bearings and having two-point-contacts engageable with said upper bearings and one-point-contacts engaging with said lower bearings.

3. In a truck, the combination with side frames and a truck bolster, of lower bearings partaking of the lateral movements of said side frames, upper bearings partaking of the endwise movements of said bolster transversely of the truck, and lateral motion rockers interposed between said upper and lower bearings and having two-point-contacts with said upper bearings and one-point-contacts with said lower bearings, the said single-point-contacts having a rocking or traveling engagement with said lower bearing, substantially as described.

4. In a truck, the combination with truck side frames and a truck bolster, of lower bearings partaking of the lateral movements of said side frames, upper bearings partaking of the endwise movements of the bolster, and three-point lateral motion rockers interposed between said upper and lower bearings and comprising each, a spring base, a spring cap and interposed springs, substantially as described.

5. In a truck, the combination with truck side frames and a truck bolster, of lower bearings partaking of the lateral movements of said side frames, upper bearings partaking of the endwise movements of the said bolster transversely of the truck, and lateral motion rockers interposed between said upper and lower bearings and each comprising a spring base, a spring cap and interposed springs, said spring caps having two-point-contacts with said upper bearings, and said spring bases having single-point contacts with said lower bearings.

6. In a truck, the combination with truck side frames and a truck bolster, of lower bearings partaking of the lateral movements of said side frames, upper bearings partaking of the endwise movements of the said bolster transversely of the truck, and lateral motion rockers interposed between said upper and lower bearings and each comprising a spring base, a spring cap and interposed springs, said spring caps having two-point-contacts engageable with said upper bearings, and said spring bases having single-point-contacts with said lower bearings, the said single-point-contacts having a rocking or traveling engagement with said lower bearings, substantially as described.

In testimony whereof I affix my signature in presence of two witnesses.

WILLIAM H. WILSON.

Witnesses:
F. D. MERCHANT,
HARRY D. KILGORE.